US009606828B2

(12) United States Patent
Ghosh et al.

(10) Patent No.: US 9,606,828 B2
(45) Date of Patent: *Mar. 28, 2017

(54) SELECTING VIRTUAL MACHINES TO BE MIGRATED TO PUBLIC CLOUD DURING CLOUD BURSTING BASED ON RESOURCE USAGE AND SCALING POLICIES

(71) Applicant: International Business Machines Corporation, Armonk, NY (US)

(72) Inventors: Rahul Ghosh, Morrisville, NC (US); Giribabu V. Paramkusham, Morrisville, NC (US); Aaron J. Quirk, Cary, NC (US); Upendra Sharma, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,361

(22) Filed: Apr. 11, 2015

(65) Prior Publication Data
US 2016/0055023 A1 Feb. 25, 2016

Related U.S. Application Data

(63) Continuation of application No. 14/465,116, filed on Aug. 21, 2014.

(51) Int. Cl.
*G06F 9/46* (2006.01)
*G06F 9/455* (2006.01)
(Continued)

(52) U.S. Cl.
CPC ........ *G06F 9/45558* (2013.01); *G06F 9/4856* (2013.01); *G06F 9/5083* (2013.01);
(Continued)

(58) Field of Classification Search
None
See application file for complete search history.

(56) References Cited

U.S. PATENT DOCUMENTS 8,095,929 B1 * 1/2012 Ji ........................... G06F 9/4856
709/223
8,261,295 B1 * 9/2012 Risbood .................... G06F 8/61
717/177

(Continued)

OTHER PUBLICATIONS

List of IBM Patents or Patent Applications Treated as Related, Apr. 11, 2015, pp. 1-2.

(Continued)

*Primary Examiner* — Emerson Puente
*Assistant Examiner* — Mehran Kamran
(74) *Attorney, Agent, or Firm* — Robert A. Voigt, Jr.; Winstead, P.C.

(57) ABSTRACT

A method, system and computer program product for selecting virtual machines to be migrated to a public cloud. The current resource usage for virtual machine instances running in the private cloud is determined. Furthermore, any scaling policies attached to the virtual machine instances running in the private cloud are obtained. Additional resource usages for any of the virtual machine instances with a scaling policy are computed for when these virtual machine instances are scaled out. A cost of running a virtual machine instance in the public cloud is then determined using its current resource usage as well as any additional resource usage if a scaling policy is attached to the virtual machine instance based on the cost for running virtual machine instances in a public cloud. If the cost is less than a threshold cost, then the virtual machine instance is selected to be migrated to the public cloud.

2 Claims, 8 Drawing Sheets

(51) Int. Cl.
- *G06F 9/48* (2006.01)
- *G06F 9/50* (2006.01)
- *H04L 12/24* (2006.01)
- *H04L 12/911* (2013.01)

(52) U.S. Cl.
CPC ........ *H04L 41/0846* (2013.01); *H04L 47/781* (2013.01); *G06F 2009/4557* (2013.01); *G06F 2009/45595* (2013.01)

(56) References Cited

U.S. PATENT DOCUMENTS

| | | | | |
|---|---|---|---|---|
| 8,572,612 B2* | 10/2013 | Kern | G06F 9/5072 | 717/177 |
| 8,631,458 B1* | 1/2014 | Banerjee | G06F 9/45558 | 718/1 |
| 2008/0295096 A1* | 11/2008 | Beaty | G06F 9/4856 | 718/1 |
| 2010/0131624 A1* | 5/2010 | Ferris | G06F 9/5072 | 709/221 |
| 2010/0223378 A1* | 9/2010 | Wei | H04L 41/0896 | 709/224 |
| 2010/0287263 A1* | 11/2010 | Liu | G06F 9/5088 | 709/221 |
| 2011/0209146 A1* | 8/2011 | Box | G06F 9/5077 | 718/1 |
| 2011/0258621 A1* | 10/2011 | Kern | G06F 9/5072 | 718/1 |
| 2012/0096149 A1* | 4/2012 | Sunkara | G06F 9/5072 | 709/224 |
| 2012/0131194 A1* | 5/2012 | Morgan | G06F 9/5072 | 709/226 |
| 2012/0137002 A1* | 5/2012 | Ferris | G06F 9/5072 | 709/226 |
| 2012/0222041 A1* | 8/2012 | Sabin | H04L 67/1008 | 718/105 |
| 2012/0290460 A1* | 11/2012 | Curry, Jr. | G06Q 30/08 | 705/37 |
| 2012/0297016 A1* | 11/2012 | Iyer | G06F 9/5072 | 709/217 |
| 2012/0304179 A1* | 11/2012 | Devarakonda | G06Q 10/00 | 718/102 |
| 2013/0061220 A1* | 3/2013 | Gnanasambandam | G06F 9/45558 | 718/1 |
| 2013/0238772 A1* | 9/2013 | Armour | G06F 9/4843 | 709/223 |
| 2013/0238804 A1* | 9/2013 | Tanino | G06F 9/5088 | 709/226 |
| 2013/0268940 A1* | 10/2013 | Gmach | G06F 9/5077 | 718/104 |
| 2013/0283364 A1* | 10/2013 | Chang | H04L 49/70 | 726/12 |
| 2013/0339419 A1* | 12/2013 | Emaru | G06F 9/4856 | 709/201 |
| 2013/0346572 A1* | 12/2013 | Jain | G06F 9/5088 | 709/223 |
| 2014/0019415 A1* | 1/2014 | Barker | G06F 17/303 | 707/643 |
| 2014/0058871 A1* | 2/2014 | Marr | G06F 9/45533 | 705/26.1 |
| 2014/0082202 A1* | 3/2014 | Zhao | G06F 9/45558 | 709/226 |
| 2014/0278808 A1* | 9/2014 | Iyoob | G06Q 30/0206 | 705/7.35 |
| 2014/0279201 A1* | 9/2014 | Iyoob | G06Q 30/0631 | 705/26.7 |
| 2014/0337837 A1* | 11/2014 | Padala | G06F 9/5072 | 718/1 |
| 2015/0052218 A1* | 2/2015 | Zhang | G06F 9/4856 | 709/217 |
| 2015/0052523 A1* | 2/2015 | Raghu | G06F 9/45533 | 718/1 |
| 2015/0052524 A1* | 2/2015 | Raghu | G06F 9/455 | 718/1 |
| 2015/0089064 A1* | 3/2015 | Salle | H04L 47/125 | 709/226 |
| 2015/0143366 A1* | 5/2015 | Suragi Math | G06F 9/5072 | 718/1 |
| 2015/0156065 A1* | 6/2015 | Grandhe | H04L 41/5054 | 709/224 |
| 2015/0222702 A1* | 8/2015 | Salle | G06F 9/4856 | 709/201 |
| 2015/0222723 A1* | 8/2015 | Adapalli | H04L 67/2809 | 705/26.41 |
| 2015/0263894 A1* | 9/2015 | Kasturi | H04L 41/0806 | 709/222 |
| 2015/0263960 A1* | 9/2015 | Kasturi | H04L 47/22 | 370/230.1 |
| 2015/0295731 A1* | 10/2015 | Bagepalli | H04L 12/6418 | 370/401 |
| 2015/0304176 A1* | 10/2015 | Ting | H04L 67/1031 | 709/203 |
| 2015/0304230 A1* | 10/2015 | Suparna | G06F 9/5072 | 709/224 |
| 2015/0378765 A1* | 12/2015 | Singh | G06F 9/45558 | 718/1 |
| 2015/0381435 A1* | 12/2015 | Todd | H04L 41/50 | 709/223 |

OTHER PUBLICATIONS

U.S. Appl. No. 14/465,116, filed Aug. 21, 2014.
Guo et al., "Seagull: Intelligent Cloud Bursting for Enterprise Applications," https://www.usenix.org/system/files/conference/atc12/atc12-final57.pdf, Proceedings of the USENIX Annual Technical Conference, Jun. 13-15, 2012, Boston, Massachusetts, pp. 1-6.
Mell et al., "The NIST Definition of Cloud Computing," Special Publication 800-145, Sep. 2011, pp. 1-7.
Office Action for U.S. Appl. No. 14/465,116 dated Apr. 1, 2016, pp. 1-38.
Guo et al., "Seagull: Intelligent Cloud Bursting for Enterprise Applications," 2012, Proceedings of the 2012 USENIX Conference on Annual Technical Conference, USENIX ATC, pp. 1-6.
Office Action for U.S. Appl. No. 14/465,116 dated Aug. 25, 2016, pp. 1-35.

* cited by examiner

SELECTING VIRTUAL MACHINES TO BE MIGRATED TO PUBLIC CLOUD DURING CLOUD BURSTING BASED ON RESOURCE USAGE AND SCALING POLICIES

TECHNICAL FIELD

The present invention relates generally to cloud computing, and more particularly to selecting virtual machines to be migrated to the public cloud during cloud bursting based on resource usage and scaling policies.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

The cloud computing environment may be deployed in a "hybrid cloud" topology, which is composed of two or more clouds, such as a private cloud and a public cloud, that remain distinct entities but are bound together by standardized or proprietary technology that enables data and application portability (e.g., cloud bursting for load balancing between clouds).

In the hybrid cloud topology, "cloud bursting" or "capacity scale out" may occur when an application workload (referring to the amount of processing that a hardware component has been given to do at a given time) experiences a peak load condition. "Cloud bursting" or "capacity scale out" may involve scaling out the virtual machine instances running in the private cloud by creating replications of these virtual machine instances in the public cloud to handle the peak load condition. A "capacity scale in" may involve the scaling in or the de-provisioning of these replicated virtual machine instances in the public cloud.

Typically, the decision as to whether to scale out a virtual machine instance to the public cloud during cloud bursting is based, at least in part, on the size (e.g., number of virtual cores) and current memory usage (e.g., 768 megabytes) of the virtual machine instance. If the cost is deemed acceptable, then such a virtual machine instance is scaled out. However, virtual machines may be associated with a scaling policy. A scaling policy defines the rules that will allow the virtual machine to expand or shrink their virtual resources under certain application workload demands. For example, a scaling policy may enable a virtual machine to scale out and create additional virtual machine instances in response to an increase in application workload demand.

Currently, the decision as to which virtual machine instances running in the private cloud are to be scaled out to the public cloud during cloud bursting do not take into consideration the scaling policy of the virtual machine instances. As a result, if the replicated virtual machine instance that was created in the public cloud has a scaling policy that created additional public cloud virtual machines when the application workload demand increased, then the cost of cloud bursting would be higher than anticipated. Consequently, the current cloud bursting policies are not optimized for hybrid cloud usage cost.

BRIEF SUMMARY

In one embodiment of the present invention, a method for selecting virtual machines to be migrated to a public cloud during cloud bursting comprises determining current resource usage for each of a plurality of virtual machine instances running in a private cloud. The method further comprises obtaining one or more scaling policies for the plurality of virtual machine instances running in the private cloud. The method additionally comprises computing additional resource usage for each of the plurality of virtual machine instances with a scaling policy when scaled out. Furthermore, the method comprises receiving a cost for running virtual machine instances in the public cloud based on resource usage. Additionally, the method comprises determining, by a processor, a cost of running a virtual machine instance of the plurality of virtual machine instances in the public cloud using the current resource usage and the additional resource usage when the virtual machine instance of the plurality of virtual machine instances is scaled out based on the received cost for running the virtual machine instances in the public cloud. In addition, the method comprises selecting the virtual machine instance of the plurality of virtual machine instances to be migrated from the private cloud to the public cloud in response to the cost being less than a threshold value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
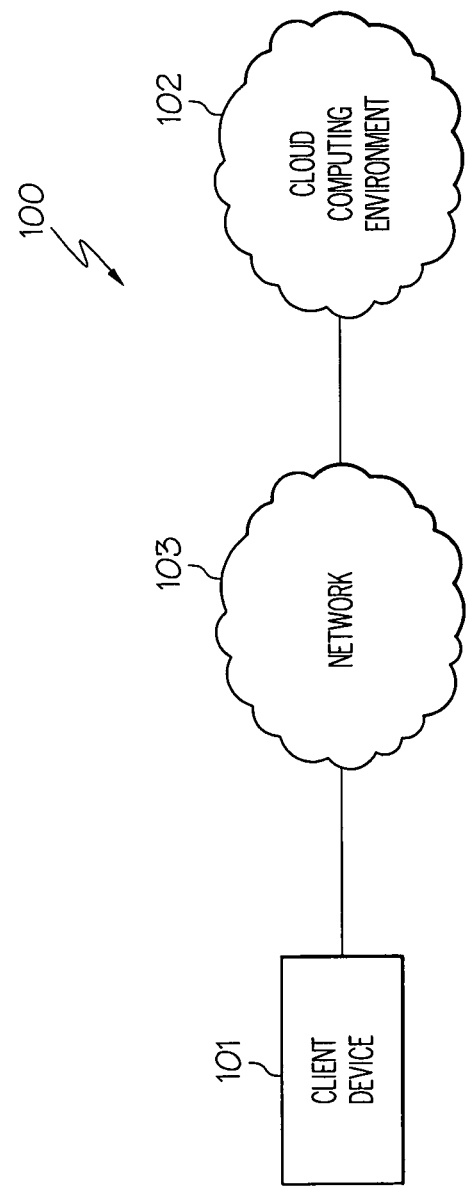
FIG. 1 illustrates a network system configured in accordance with an embodiment of the present invention.

The present invention comprises a method, system and computer program product for selecting virtual machines to be migrated to a public cloud during cloud bursting. In one embodiment of the present invention, current resource usage (e.g., processing and memory usage) for virtual machine instances running in the private cloud is determined. Furthermore, any scaling policies attached to the virtual machine instances running in the private cloud are obtained. A scaling policy defines the rules that will allow the virtual machine to expand or shrink their virtual resources under certain application workload demands. The additional resource usages for any of the virtual machine instances with a scaling policy are computed for when these virtual machine instances are scaled out. The cost for running virtual machine instances in the public cloud based on resource usage is received. A cost of running one of the virtual machine instances, currently located in the private cloud, in the public cloud is then determined using its current resource usage as well as any additional resource usage when scaled out if a scaling policy is attached to the virtual machine instance based on the received cost for running virtual machine instances in a public cloud. If the cost of running the virtual machine instance, currently located in the private cloud, in the public cloud is less than a threshold cost, then the virtual machine instance is selected to be migrated from the private cloud to the public cloud. In this manner, by taking into consideration the scaling policies associated with the virtual machine instances, a more accurate assessment may be made as to the amount of resources that may be utilized in the public cloud thereby more accurately determining the potential public cloud usage cost.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
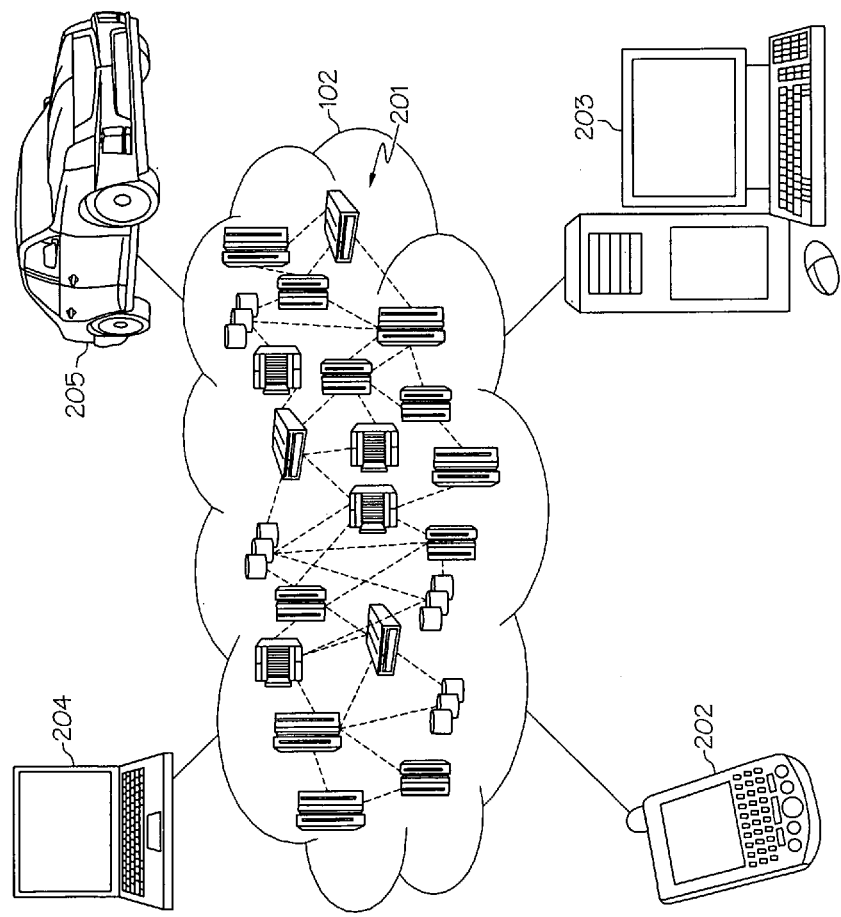
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes 201 may include one or more racks of compute nodes (e.g., servers) that are managed by a server (referred to herein as the "administrative server") in cloud computing environment 102 as discussed below in greater detail in connection with FIG. 4.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
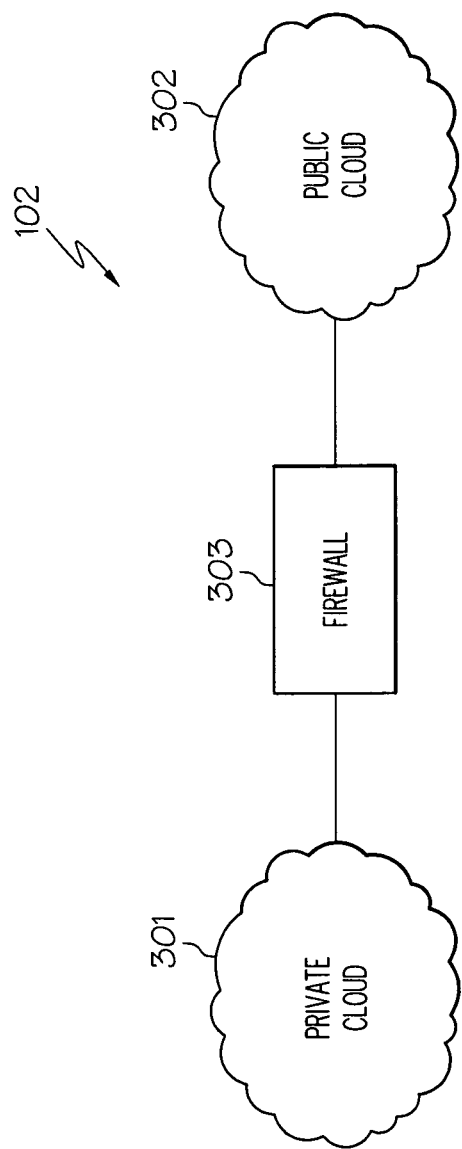
FIG. 3 illustrates a hybrid cloud topology that consists of a private cloud and a private cloud in accordance with an embodiment of the present invention.

As discussed above, cloud computing environment 102 may exhibit a hybrid cloud topology, such as a hybrid cloud topology that consists of a private cloud and a private cloud as shown in FIG. 3 in accordance with an embodiment of the present invention.

Referring now to FIG. 3, cloud computing environment 102 may exhibit a hybrid cloud topology that consists of a private cloud 301 and a public cloud 302. As discussed above, private cloud 301 has an infrastructure provisioned for exclusive use by a single organization comprising multiple consumers (e.g., business units). As also discussed above, public cloud 302 has an infrastructure provisioned for open use by the general public. In one embodiment, private cloud 301 is protected from public access, such as by way of a firewall 303.

Figure 4:
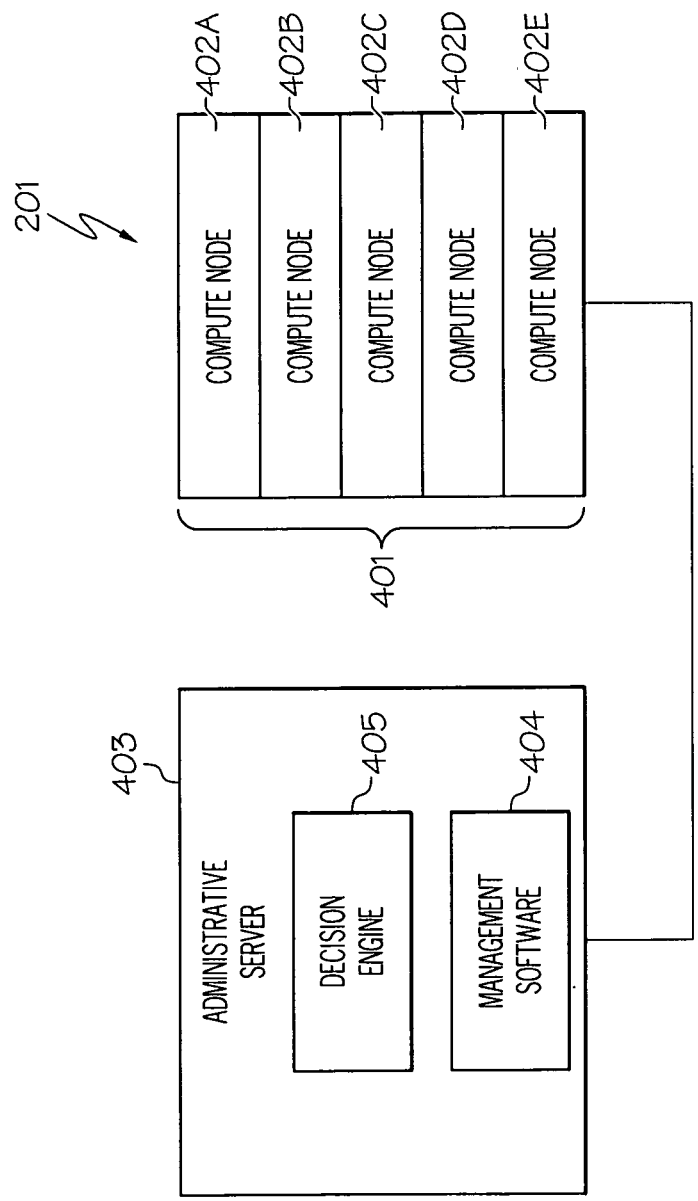
FIG. 4 illustrates a schematic of a rack of compute nodes of the cloud computing node that is managed by an administrative server in accordance with an embodiment of the present invention.

Referring now to FIG. 4, FIG. 4 illustrates a schematic of a rack of compute nodes (e.g., servers) of a cloud computing node 201 (FIG. 2) that are managed by an administrative server in private cloud 301 (FIG. 3) in accordance with an embodiment of the present invention.

As shown in FIG. 4, cloud computing node 201 may include a rack 401 of hardware components or "compute nodes," such as servers or other electronic devices. For example, rack 401 houses compute nodes 402A-402E. Compute nodes 402A-402E may collectively or individually be referred to as compute nodes 402 or compute node 402, respectively. An illustrative virtualization environment for compute node 402 is discussed further below in connection with FIG. 5. FIG. 4 is not to be limited in scope to the number of racks 401 or compute nodes 402 depicted. For example, cloud computing node 201 may be comprised of any number of racks 401 which may house any number of compute nodes 402. Furthermore, while FIG. 4 illustrates rack 401 housing compute nodes 402, rack 401 may house any type of computing component that is used by cloud computing node 201. Furthermore, while the following discusses compute node 402 being confined in a designated rack 401, it is noted for clarity that compute nodes 402 may be distributed across cloud computing environment 102 (FIGS. 1-3).

As further shown in FIG. 4, rack 401 is coupled to an administrative server 403 configured to provide data center-level functions. Administrative server 403 supports a module, referred to herein as the management software 404, that can be used to manage all the compute nodes 402 of cloud computing node 201, monitor system utilization, intelligently deploy images of data and optimize the operations of cloud computing environment 102.

Furthermore, administrative server 403 includes a module, referred to herein as the "decision engine" 405, configured to select the virtual machines in the private cloud to be migrated to the public cloud during "cloud bursting" or "capacity scale out" as discussed further below. A description of the hardware configuration of administrative server 403 is provided further below in connection with FIG. 6.

Figure 5:
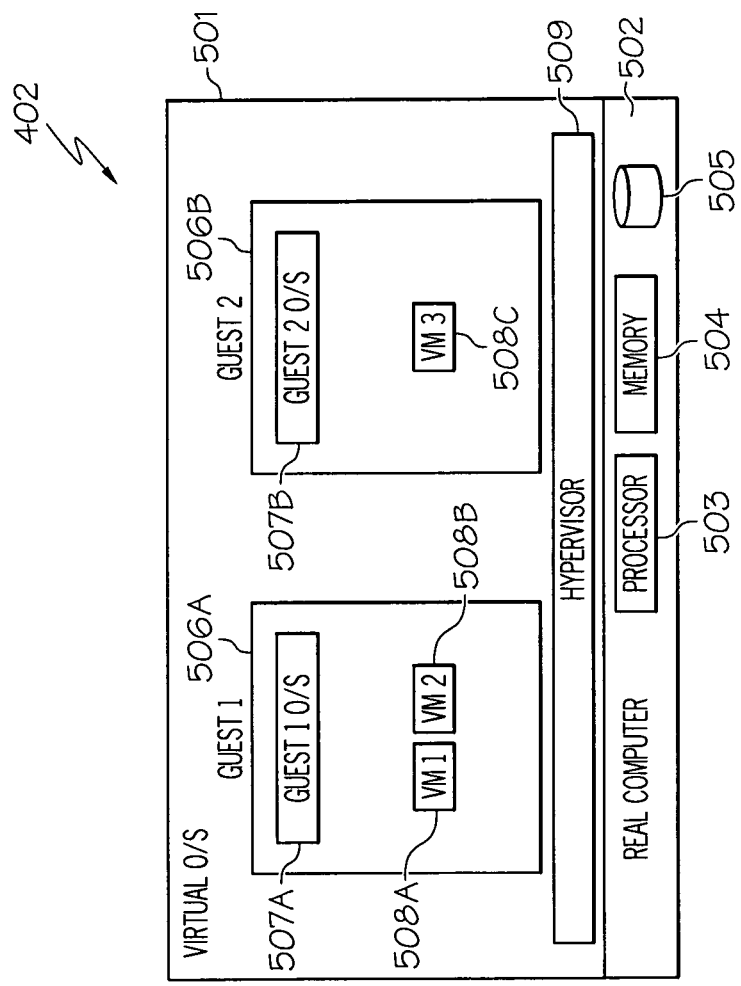
FIG. 5 illustrates a virtualization environment for a compute node in accordance with an embodiment of the present invention.

Referring now to FIG. 5, FIG. 5 illustrates a virtualization environment for compute node 402 (FIG. 4) in accordance with an embodiment of the present invention. Compute node 402 includes a virtual operating system 501. Operating system 501 executes on a real or physical computer 502. Real computer 502 includes one or more processors 503, a memory 504 (also referred to herein as the host physical memory), one or more disk drives 505 and the like. Other components of real computer 502 are not discussed herein for the sake of brevity.

Virtual operating system 501 further includes user portions 506A-506B (identified as "Guest 1" and "Guest 2," respectively, in FIG. 5), referred to herein as "guests." Each guest 506A, 506B is capable of functioning as a separate system. That is, each guest 506A-506B can be independently reset, host a guest operating system 507A-507B, respectively, (identified as "Guest 1 O/S" and "Guest 2 O/S," respectively, in FIG. 5) and operate with different programs. An operating system or application program running in guest 506A, 506B appears to have access to a full and complete system, but in reality, only a portion of it is available. Guests 506A-506B may collectively or individually be referred to as guests 406 or guest 406, respectively. Guest operating systems 507A-507B may collectively or individually be referred to as guest operating systems 507 or guest operating system 507, respectively.

Each guest operating system 507A, 507B may host one or more virtual machine applications 508A-508C (identified as "VM 1," "VM 2" and "VM 3," respectively, in FIG. 5), such as Java™ virtual machines. For example, guest operating system 507A hosts virtual machine applications 508A-508B. Guest operating system 507B hosts virtual machine application 508C. Virtual machines 508A-508C may collectively or individually be referred to as virtual machines 508 or virtual machine 508, respectively.

Virtual operating system 501 further includes a common base portion 509, referred to herein as a hypervisor. Hypervisor 509 may be implemented in microcode running on processor 503 or it may be implemented in software as part of virtual operating system 501. Hypervisor 509 is configured to manage and enable guests 506 to run' on a single host.

As discussed above, virtual operating system 501 and its components execute on physical or real computer 502. These software components may be loaded into memory 504 for execution by processor 503.

The virtualization environment for compute node 402 is not to be limited in scope to the elements depicted in FIG. 5. The virtualization environment for compute node 402 may include other components that were not discussed herein for the sake of brevity.

Figure 6:
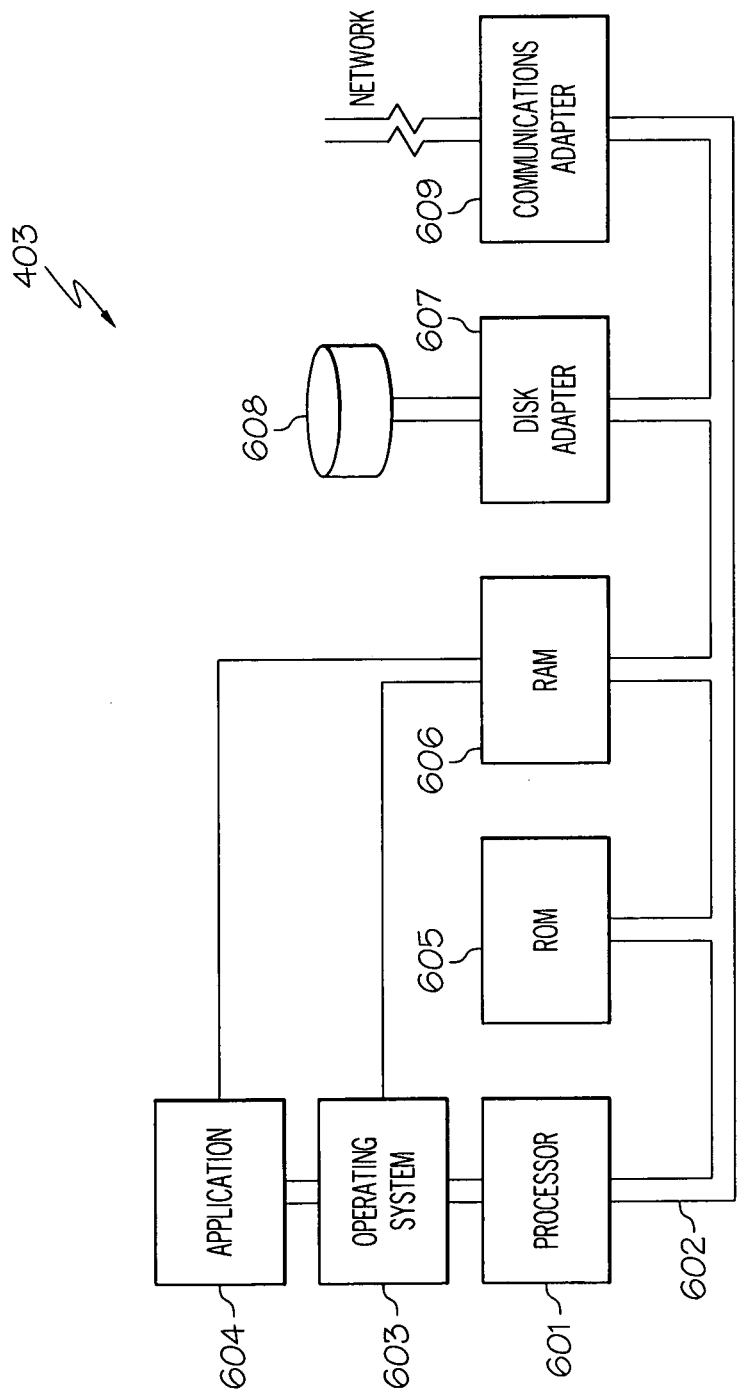
FIG. 6 illustrates a hardware configuration of an administrative server in the private cloud configured in accordance with an embodiment of the present invention.

Referring now to FIG. 6, FIG. 6 illustrates a hardware configuration of administrative server 403 (FIG. 4) in private cloud 301 (FIG. 3) which is representative of a hardware environment for practicing the present invention. Administrative server 403 has a processor 601 coupled to various other components by system bus 602. An operating system 603 runs on processor 601 and provides control and coordinates the functions of the various components of FIG. 6. An application 604 in accordance with the principles of the present invention runs in conjunction with operating system 603 and provides calls to operating system 603 where the calls implement the various functions or services to be performed by application 604. Application 604 may include, for example, a program (e.g., decision engine 405 of FIG. 4) for selecting the virtual machines in the private cloud to be migrated to the public cloud during "cloud bursting" or "capacity scale out" as discussed further below in association with FIGS. 7A-7B.

Referring again to FIG. 6, read-only memory ("ROM") 605 is coupled to system bus 602 and includes a basic input/output system ("BIOS") that controls certain basic functions of administrative server 403. Random access memory ("RAM") 606 and disk adapter 607 are also coupled to system bus 602. It should be noted that software components including operating system 603 and application 604 may be loaded into RAM 606, which may be administrative server's 403 main memory for execution. Disk adapter 607 may be an integrated drive electronics ("IDE") adapter that communicates with a disk unit 608, e.g., disk drive. It is noted that the program for selecting the virtual machines in the private cloud to be migrated to the public cloud during "cloud bursting" or "capacity scale out," as discussed further below in association with FIGS. 7A-7B, may reside in disk unit 608 or in application 604.

Administrative server 403 may further include a communications adapter 609 coupled to bus 602. Communications adapter 609 interconnects bus 602 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external-storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in the hybrid cloud topology, "cloud bursting" or "capacity scale out" may occur when an application workload (referring to the amount of processing that a hardware component has been given to do at a given time) experiences a peak load condition. "Cloud bursting" or "capacity scale out" may involve scaling out the virtual machine instances running in the private cloud by creating replications of these virtual machine instances in the public cloud to handle the peak load condition. A "capacity scale in" may involve the scaling in or the de-provisioning of these replicated virtual machine instances in the public cloud. Typically, the decision as to whether to scale out a virtual machine instance to the public cloud during cloud bursting is based, at least in part, on the size (e.g., number of virtual cores) and current memory usage (e.g., 768 megabytes) of the virtual machine instance. If the cost is deemed acceptable, then such a virtual machine instance is scaled out. However, virtual machines may be associated with a scaling policy. A scaling policy defines the rules that will allow the virtual machine to expand or shrink their virtual resources under certain application workload demands. For example, a scaling policy may enable a virtual machine to scale out and create additional virtual machine instances in response to an increase in application workload demand. Currently, the decision as to which virtual machine instances running in the private cloud are to be scaled out to the public cloud during cloud bursting do not take into consideration the scaling policy of the virtual machine instances. As a result, if the replicated virtual machine instance that was created in the public cloud has a scaling policy that created additional public cloud virtual machines when the application workload demand increased, then the cost of cloud bursting would be higher than anticipated. Consequently, the current cloud bursting policies are not optimized for hybrid cloud usage cost.

The principles of the present invention provide a means for optimizing the hybrid cloud usage cost by selecting the virtual machine instances 508 (FIG. 5) to be migrated from private cloud 301 (FIG. 3) to public cloud 302 (FIG. 3) based on resource usage and scaling policies as discussed further below in connection with FIGS. 7A-7B. By taking into consideration the scaling policies associated with virtual machine instances 508, a more accurate assessment may be made as to the amount of resources that may be utilized in public cloud 302 thereby more accurately determining the potential public cloud usage cost.

Figure 7A:
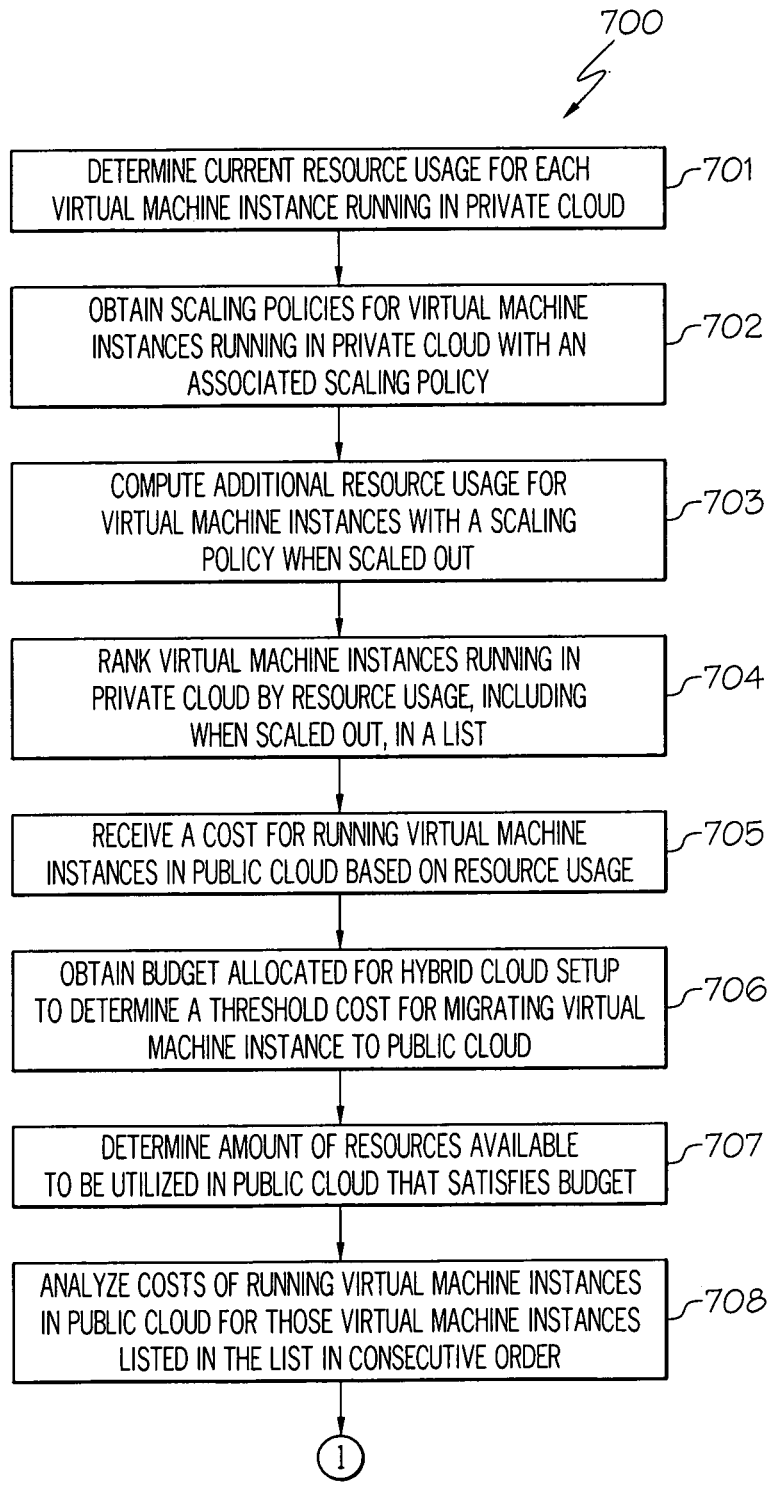
FIGS. 7A-7B are a flowchart of a method for selecting virtual machine instances to be migrated from the private cloud to the public cloud in accordance with an embodiment of the present invention.
Figure 7B:
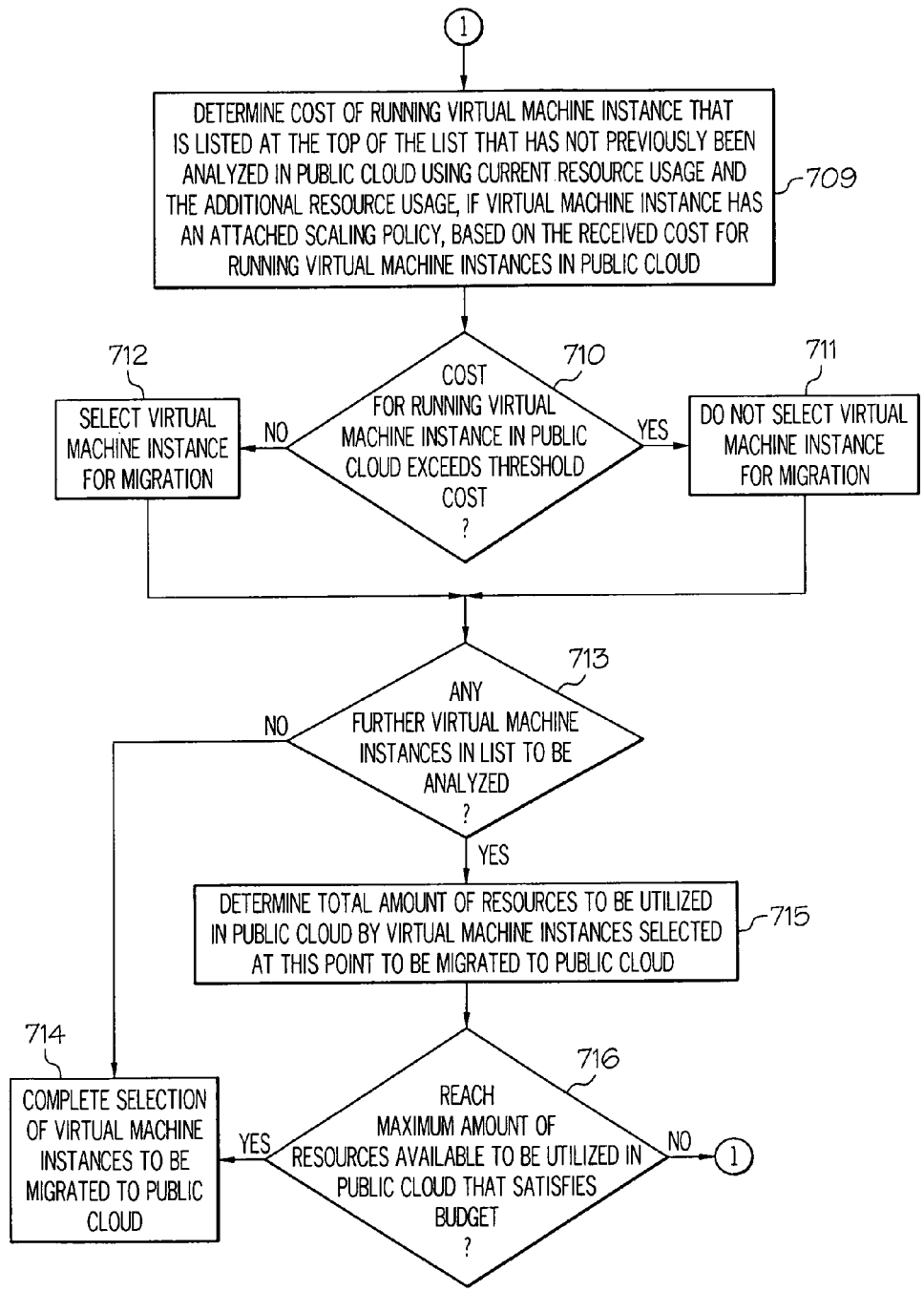

Referring now to FIGS. 7A-7B, FIGS. 7A-7B are a flowchart of a method 700 for selecting virtual machine instances 508 (FIG. 5) to be migrated from private cloud 301 (FIG. 3) to public cloud 302 (FIG. 3) in accordance with an embodiment of the present invention. "Migrating," as used herein, may refer to creating a replication of the virtual machine instance 508 (virtual machine instance running in private cloud 301) in public cloud 302.

Referring now to FIG. 7A, in conjunction with FIGS. 1-6, in step 701, decision engine 405 determines the current resource usage (e.g., processing and memory usage) for each virtual machine instance 508 running in private cloud 301. In one embodiment, decision engine 405 determines the current resource usage, such as for processing and memory usage, by monitoring the usage of processors, such as virtual processors, and memory, such as RAM memory, utilized by virtual machine instances 508.

In step 702, decision engine 405 obtains the scaling polices for virtual machine instances 508 running in private cloud 301 with an associated scaling policy. A scaling policy defines the rules that will allow the virtual machine to expand or shrink their virtual resources under certain application workload demands. In one embodiment, the scaling policy is attached to a virtual machine instance 508 and provided by the user (i.e., the user receiving the services provided by the cloud computing environment).

In step 703, decision engine 405 computes the additional resource usage for virtual machine instances 508 with a scaling policy when scaled out. For example, if virtual machine instance 508A (e.g., virtual machine instance that utilizes 16 vCPUs) has an attached scaling policy that allows it to scale out by replicating up to five further virtual machine instances, then decision engine 405 computes the additional resource usage for replicating an additional five virtual machine instances (e.g., five further virtual machine instances that each utilize 16 vCPUs).

In step 704, decision engine 405 ranks the virtual machine instances 508 running in private cloud 301 by resource usage, including when scaled out for those with an attached scaling policy, in a list. These virtual machine instances 508 are ranked in order of resource usage so that the virtual machine instances 508 that utilize more resources are ranked higher than those that utilize fewer resources. In this manner, as will be discussed in further detail below, the set of virtual machine instances 508 that are selected to be migrated from private cloud 301 to public cloud 302 will include those that maximize the amount of resources freed in private cloud 301.

In step 705, decision engine 405 receives a cost for running virtual machine instances 508 in public cloud 302 based on resource usage. For example, an entity may charge a fee for running a virtual machine instance 508 on public cloud 302, such as based on the number of virtual cores utilized by virtual machine instance 508 as well as the amount of memory (e.g., RAM) utilized by virtual machine instance 508. For instance, a fee of $0.09/hour may be charged for a virtual machine instance with 1 virtual core that utilizes 1.75 gigabytes of RAM. In another example, a fee of $0.18/hour may be charged for a virtual machine instance with 2 virtual cores that utilizes 3.5 gigabytes of RAM. Such information may be provided to decision engine 405 by the entity charging the fee for the usage of resources in public cloud 302.

In step 706, decision engine 405 obtains the budget of the private cloud provider allocated for utilizing the hybrid cloud topology, such as shown in FIG. 3, to determine a threshold cost for migrating virtual machine instances 508 from private cloud 301 to public cloud 302. If the cost of operating private cloud 301 without utilizing public cloud 302 is known, then an amount that can be spent utilizing public cloud 302 (i.e., a budget for utilizing public cloud 302) can be determined based on the budget allocated for utilizing the hybrid cloud topology (utilizing both private cloud 301 and public cloud 302). A threshold cost may be determined based on the budget allocated for utilizing public cloud 302 and the highest fee charged by the operator of public cloud 302 for utilizing a maximum amount of resources (e.g., processing and memory resources). In one embodiment, the threshold cost may correspond to a percentage of the highest fee charged by the operator of public cloud 302 for utilizing a maximum amount of resources for a period of time (e.g., the highest fee charged for a month of service) divided by the budget for utilizing public cloud 302 over that same period of time.

In step 707, decision engine 405 determines an amount of resources (e.g., processing and memory resources) available to be utilized in public cloud 302 that satisfies the budget allocated for utilizing the hybrid cloud topology. As discussed above, decision engine 405 receives the cost for running virtual machine instances 508 in public cloud 302 based on resource usage. Hence, decision engine 405 will be able to determine the amount of resources available to be utilized in public cloud 302 that satisfies the budget allocated for utilizing the hybrid cloud topology based on the cost for running virtual machine instances 508 in public cloud 302 based on resource usage. For example, decision engine 405 may determine the amount of processing (e.g., virtual processing) and memory (e.g., RAM) that could be utilized by virtual machine instances 508 in public cloud 302 based on the fees charged by the operator of public cloud 302 without exceeding the budget for utilizing public cloud 302.

In step 708, decision engine 405 analyzes the cost of running virtual machine instances 508 in public cloud 302 for those virtual machine instances 508 listed in the list generated in step 704 in consecutive order as discussed further below in connection with FIG. 7B. For example, the virtual machine instance 508 listed at the top of the list generated in step 704 with the greatest amount of resource utilization will be analyzed first followed by the virtual machine instance 508 with the next greatest amount of resource utilization and so forth.

Referring to FIG. 7B, in conjunction with FIGS. 1-6, in step 709, decision engine 405 determines the cost of running virtual machine instance 508 that is listed at the top of the list (list generated in step 704) that has not previously been analyzed in public cloud 302 using the current resource usage and the additional resource usage, if virtual machine instance 508 has an attached scaling policy, based on the received cost for running virtual machine instances 508 in public cloud 302 (received in step 705). For example, if virtual machine instance 508A is listed at the top of the list (list generated in step 704) and has not been previously analyzed, then decision engine 405 determines the cost of running virtual machine instance 508A in public cloud 302 based on its current resource utilization as well as any additional potential resource utilization if it can scale out based on an attached scaling policy. The cost can be determined based on the fees charged by the operator of public cloud 302 for the utilization of resources (e.g., processing and memory resources) in public cloud 302.

In step 710, a determination is made by decision engine 405 as to whether the cost for running virtual machine instance 508 in public cloud 302 exceeds the threshold cost.

If the cost for running virtual machine instance 508 in public cloud 302 exceeds the threshold cost, then, in step 711, decision engine 405 does not select virtual machine instance 508 for migration to public cloud 302.

If, however, the cost for running virtual machine instance 508 in public cloud 302 does not exceed the threshold cost, then, in step 712, decision engine 405 selects virtual machine instance 508 for migration to public cloud 302.

Upon selecting or not selecting virtual machine instance 508 for migration to public cloud 302, in step 713, a determination is made by decision engine 405 as to whether any further virtual machine instances 508 in the list (list generated in step 704) have not yet been analyzed.

If there are no further virtual machine instances 508 in the list that have yet to be analyzed, then, in step 714, decision engine 405 has completed the selection of virtual machine instances 508 to be migrated from private cloud 301 to public cloud 302.

If, however, there are further virtual machine instances 508 that have yet to be analyzed, then, in step 715, decision engine 405 determines the total amount of resources to be utilized in public cloud 302 by virtual machine instances 508 selected at this point to be migrated to public cloud 302.

In step 716, a determination is made by decision engine 405 as to whether the total amount of resources to be utilized in public cloud 302 by virtual machine instances 508 selected at this point to be migrated to public cloud 302 has reached the maximum amount of resources available to be utilized in public cloud 302 that satisfies the budget allocated for utilizing the hybrid cloud topology (determined in step 707 of FIG. 7A).

If the total amount of resources to be utilized in public cloud 302 by virtual machine instances 508 selected at this point to be migrated to public cloud 302 has not reached the maximum amount of resources available to be utilized in public cloud 302 that satisfies the budget allocated for utilizing the hybrid cloud topology, then, in step 709, decision engine 405 determines the cost of running the next highest rated virtual machine instance 508 in the list (list generated in step 704) that has not previously been analyzed in public cloud 302 using the current resource usage and the additional resource usage, if virtual machine instance 508 has an attached scaling policy, based on the received cost for running virtual machine instances 508 in public cloud 302 (received in step 705).

If, however, the total amount of resources to be utilized in public cloud 302 by virtual machine instances 508 selected at this point to be migrated to public cloud 302 has reached the maximum amount of resources available to be utilized in public cloud 302 that satisfies the budget allocated for utilizing the hybrid cloud topology, then decision engine 405 has completed the selection of virtual machine instances 508 to be migrated from private cloud 301 to public cloud 302 in step 714. By selecting those virtual machine instances 508 with the highest utilization of resources prior to those with a lower utilization of resources to be migrated to public cloud 302, the principles of the present invention maximizes the amount of resources freed in private cloud 302 while at the same time optimizing the hybrid cloud usage cost by more accurately determining the potential public cloud usage cost.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for selecting and migrating virtual machines to a public cloud during cloud bursting, the method comprising:
   determining current resource usage for each of a plurality of virtual machine instances running in a private cloud;
   obtaining one or more scaling policies for said plurality of virtual machine instances running in said private cloud;
   computing additional resource usage for each of said plurality of virtual machine instances with a scaling policy when scaled out;
   ranking said plurality of virtual machine instances running in said private cloud in a list by said determined current resource usage and said additional resource usage for those with said scaling policy;
   receiving a cost for running virtual machine instances based on resource usage in said public cloud;
   obtaining a budget of a private cloud provider allocated for utilizing a hybrid cloud topology to determine said threshold value for migrating a virtual machine instance to said public cloud;
   determining an amount of resources available to be utilized in said public cloud that satisfies said budget;
   determining, by a processor, a cost of running a virtual machine instance of said plurality of virtual machine instances in said public cloud using said current resource usage and said additional resource usage when said virtual machine instance of said plurality of virtual machine instances is scaled out based on said received cost for running said virtual machine instances in said public cloud;
   determining a cost of running each of said plurality of virtual machine instances in consecutive order as listed in said list in said public cloud until said total amount of resources to be utilized in said public cloud based on said virtual machine instances selected to be migrated from said private cloud to said public cloud reaches said amount of resources available to be utilized in said public cloud that satisfies said budget;
   determining a total amount of resources to be utilized in said public cloud based on virtual machine instances selected to be migrated from said private cloud to said public cloud; and
   selecting and migrating said virtual machine instance of said plurality of virtual machine instances from said private cloud to said public cloud in response to said cost being less than a threshold value.

2. The method as recited in claim 1, wherein said resource usage comprises processing and memory usage.

* * * * *